United States Patent [19]

Inaba et al.

[11] 4,240,112
[45] Dec. 16, 1980

[54] DIGITAL VIDEO EFFECT EQUIPMENT

[75] Inventors: Masao Inaba; Atsumi Sugimoto; Shigeru Miyahara, all of Tokyo, Japan

[73] Assignee: Nippon Electric Co., Ltd., Tokyo, Japan

[21] Appl. No.: 27,592

[22] Filed: Apr. 5, 1979

[30] Foreign Application Priority Data

Apr. 5, 1978 [JP] Japan .................................. 53-40749

[51] Int. Cl.³ ........................ H04N 5/14; H04N 9/535
[52] U.S. Cl. ...................................... 358/160; 358/22; 358/21 R
[58] Field of Search ...................... 358/22, 36, 37, 160, 358/133, 138, 164, 167, 166, 13, 21 R

[56] References Cited

U.S. PATENT DOCUMENTS

| 3,988,602 | 10/1976 | Gorsica et al. | 358/166 |
|---|---|---|---|
| 4,007,327 | 2/1977 | Cousin | 358/160 |
| 4,141,035 | 2/1970 | Maxemchuk et al. | 358/31 |

OTHER PUBLICATIONS

Rossi, "Digital Techniques for Reducing Television Noise", *SMPTE Journal*, Mar. 1978, vol. 87, pp. 134–140.

*Primary Examiner*—John C. Martin
*Attorney, Agent, or Firm*—Hopgood, Calimafde, Kalil, Blaustein & Lieberman

[57] ABSTRACT

Digital video effects equipment for providing special effects by controlling the number of quantization levels for each sample of an incoming television video signal. Each video signal sample is converted into a digital signal comprising a predetermined number of binary digits. A gradation modification circuit decreases the gradation represented by the digitized video signal and the decreased gradation signal is reconverted to an analog signal. The resultant special effects gives the video picture an oil-painting-like impression.

4 Claims, 6 Drawing Figures

FIG.1

| EXTERIOR CONTROL SIGNAL | | | OUTPUT | | | | | | | |
|---|---|---|---|---|---|---|---|---|---|---|
| C | B | A | 1st BIT (MSB) | 2nd BIT | 3rd BIT | 4th BIT | 5th BIT | 6th BIT | 7th BIT | 8th BIT (LSB) |
| 1 | 1 | 1 | ※ | ※ | ※ | ※ | ※ | ※ | ※ | ※ |
| 1 | 1 | 0 | ※ | ※ | ※ | ※ | ※ | ※ | ※ | 1 |
| 1 | 0 | 1 | ※ | ※ | ※ | ※ | ※ | ※ | 1 | 0 |
| 1 | 0 | 0 | ※ | ※ | ※ | ※ | ※ | 1 | 0 | 0 |
| 0 | 1 | 1 | ※ | ※ | ※ | ※ | 1 | 0 | 0 | 0 |
| 0 | 1 | 0 | ※ | ※ | ※ | 1 | 0 | 0 | 0 | 0 |
| 0 | 0 | 1 | ※ | ※ | 1 | 0 | 0 | 0 | 0 | 0 |
| 0 | 0 | 0 | ※ | 1 | 0 | 0 | 0 | 0 | 0 | 0 |

FIG.2

| EXTERIOR CONTROL SIGNAL | | | OUTPUT | | | | | | | |
|---|---|---|---|---|---|---|---|---|---|---|
| C | B | A | 1st BIT (MSB) | 2nd BIT | 3rd BIT | 4th BIT | 5th BIT | 6th BIT | 7th BIT | 8th BIT (LSB) |
| 1 | 1 | 1 | ※ | ※ | ※ | ※ | ※ | ※ | ※ | ※ |
| 1 | 1 | 0 | ※ | ※ | ※ | ※ | ※ | ※ | ※ | 0 |
| 1 | 0 | 1 | ※ | ※ | ※ | ※ | ※ | ※ | 0 | 1 |
| 1 | 0 | 0 | ※ | ※ | ※ | ※ | ※ | 0 | 1 | 1 |
| 0 | 1 | 1 | ※ | ※ | ※ | ※ | 0 | 1 | 1 | 1 |
| 0 | 1 | 0 | ※ | ※ | ※ | 0 | 1 | 1 | 1 | 1 |
| 0 | 0 | 1 | ※ | ※ | 0 | 1 | 1 | 1 | 1 | 1 |
| 0 | 0 | 0 | ※ | 0 | 1 | 1 | 1 | 1 | 1 | 1 |

FIG.3

| EXTERIOR CONTROL SIGNAL | | | OUTPUT | | | | | | | |
|---|---|---|---|---|---|---|---|---|---|---|
| C | B | A | 1st BIT (MSB) | 2nd BIT | 3rd BIT | 4th BIT | 5th BIT | 6th BIT | 7th BIT | 8th BIT (LSB) |
| 1 | 1 | 1 | ※ | ※ | ※ | ※ | ※ | ※ | ※ | ※ |
| 1 | 1 | 0 | ※ | ※ | ※ | ※ | ※ | ※ | ※ | 0 |
| 1 | 0 | 1 | ※ | ※ | ※ | ※ | ※ | ※ | 0 | 0 |
| 1 | 0 | 0 | ※ | ※ | ※ | ※ | ※ | 0 | 0 | 0 |
| 0 | 1 | 1 | ※ | ※ | ※ | ※ | 0 | 0 | 0 | 0 |
| 0 | 1 | 0 | ※ | ※ | ※ | 0 | 0 | 0 | 0 | 0 |
| 0 | 0 | 1 | ※ | ※ | 0 | 0 | 0 | 0 | 0 | 0 |
| 0 | 0 | 0 | ※ | 0 | 0 | 0 | 0 | 0 | 0 | 0 |

DIGITAL VIDEO EFFECT EQUIPMENT

FIELD OF THE INVENTION

The invention relates to a digital video effects equipment and, more particularly, to novel digital video equipment employing digital processing of a television video signal.

DESCRIPTION OF THE PRIOR ART

In conventional digital video effects equipment, exemplified by U.S. patent application Ser. Nos. 839,212 and 922,634, the digital video effects are achieved by changing the structure of a TV picture or by combining plural TV pictures rather than by changing the expressional quality of a TV picture. In the prior art, in order to accomplish changes in expressional quality, film techniques have been used for gradation or solarization. However, since these film techniques require extensive time for preprocessing, they are not suited for applying the desired effects to a normal TV picture on a real time basis.

It is therefore an object of the present invention to provide digital video effects equipment utilizing a novel technique of gradation modification.

It is another object of the present invention to provide digital video effects equipment capable of applying desired special video effects on a real time basis.

SUMMARY OF THE INVENTION

According to the invention, there is provided digital video effects equipment comprising an encoder (A/D converter) for encoding a television video signal into a digital video signal, said video signal having a luminance (Y) component and a chrominance (C) component; a luminance chrominance (Y/C) separating circuit supplied with said digital video signal for separating said Y and C components from each other; a pair of gradation modifying circuits for modifying the gradation of said Y and C components, respectively; a Y/C addition circuit for adding said Y component to said C component supplied from said gradation modifying circuits, respectively; a decoder (D/A converter) for converting the output of said Y/C addition circuit into an analog video signal; and a clock generator for generating clock signals to control the timing of said circuits.

It is a feature of the instant invention that the tone wedge or the gradation of a TV picture, obtained from A/D and D/A converted video signal, is increased with the increase in the number of bits assigned to each sample of the video signal. When the number of bits is decreased, a special visual effect is observed in the reproduced picture, while the gradation is decreased. The present invention utilizes this visual effect by limiting the number of bits assigned to each sample of the video signal, while applying a slight DC level compensation at the time of decoding.

It is another feature of the instant invention that to achieve the gradation modification, only a predetermined number of the first to n-th most significant bits for each video signal sample are decoded with the n−1 th and less significant bits being disregarded. For example, only the first to third most significant bits are decoded to obtain a reproduced picture of 8 gradation steps. Likewise, only the first to fourth most significant bits are decoded to provide a reproduced picture of 16 gradation steps. The reproduced picture thus obtained, with a reduced number of gradation steps, gives an oil-painting-like impression.

Other objects and features of the invention will be apparent from the following description when taken in conjunction with the accompanying drawings.

BRIEF DESCRIPTION OF THE DRAWINGS

FIG. 1 tabularly illustrates a first example of the gradation modification process according to the invention;

FIG. 2 tabularly illustrates a second example of the gradation modification process according to the invention;

FIG. 3 shows a table for illustrating a third example of the gradation modification process according to the invention;

DETAILED DESCRIPTION

When a mid-tread system is applied to the video signal encoding in the present invention, the decoding of the three MSB's results in a DC level drop corresponding to one half of the weight of the third most significant bit. Compensation is therefore performed for those bits less significant than the third most significant bit.

There are three approaches to this compensation as will be described with reference to FIGS. 1 to 3. It is assumed here that the first N bits counted from the MSB for each sample are subjected to a $2^N$-step gradation modification for decoding.

The first approach changes the (M+1)th bit, counted the MSB, to a "1" and the (N+2)th bit to a "0". The less significant bits are treated as shown in FIG. 1. In the second compensation approach, which is shown in FIG. 2, the (N+1)th bit, counted from the MSB is changed to a "0" and the (N+2)th bit, and the less significant bits, are changed to a "1". The third approach controls the variable data with an exterior control signal, as shown in FIG. 3.

FIGS. 1, 2 and 3 illustrate the results of the gradation modification with eight bits assigned to each sample of the video signal. In FIGS. 1 and 2, which are based on different DC level compensation approaches, no gradation modification is effected for a three-bit control signal (C, B, A) of a (1, 1, 1) logic level respectively. In contrast, the input codeword of each sample of the video signal is modified into a 32-step gradation for the three-bit control signal having a (1, 0, 0) logic level. Likewise, when the control signal is (0, 1, 0), the video codeword is modified to an 8-step gradation. In the figures "0" and "1" indicate fixed bits and the symbol "X" indicates that those bits, fed from the input, are allowed to pass therethrough without modification. In the example shown in FIG. 3, the data, fed from the exterior, is added to the inputed video codeword and the resultant code is subjected to the gradation modification. For example, when the control signal is (1, 0, 0), the codeword is modified to 32-step gradation. In figure 3, "X" indicates video codewords after having undergone DC level compensation. In this manner, the gradation modification performed by limiting the number of bits and the DC level compensation is carried out for the Y and C components, respectively, to give an oil-painting like impression having a desired coarseness.

Figure 4:
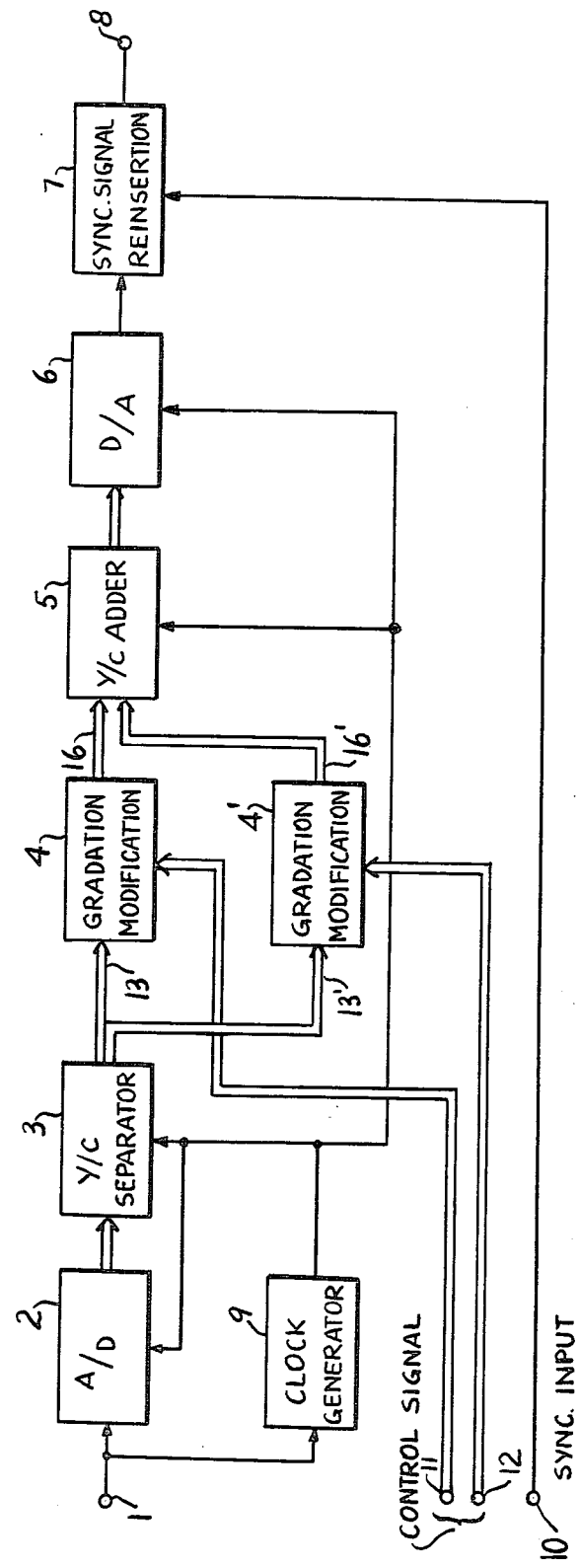
FIG. 4 shows a block diagram of an embodiment of the present invention.

Referring to FIG. 4, showing an embodiment of the invention, each sample of an analogue video signal supplied at an input terminal 1 is converted into an 8-bit parallel binary codeword at an A/D converter 2. Each binary codeword is separated into a Y component 13 and a C component 13' at a Y/C separating circuit 3. The separated Y component 13 is applied to a chrominance gradation modifying circuit 4 while the separated C component 13' to a luminance gradation modifying circuit 4'. In those circuits 4 and 4', the Y and C components 13 and 13' are subjected to the gradation modification, respectively. The output 16 and 16' from the gradation modifying circuits 4 and 4' are added to each other at a Y/C adder 5, whose output is decoded at a D/A converter 6. A synchronizing signal reinsertion circuit 7 applies a synchronizing signal, which is supplied from a terminal 10, to the reproduced analog signal supplied from the D/A converter 6, to provide a reproduced analog TV video signal. A control signal is applied to a luminance gradation circuit 4, through a terminal 11, and also to a chrominance gradation circuit 4' through a terminal 12.

Figure 5:
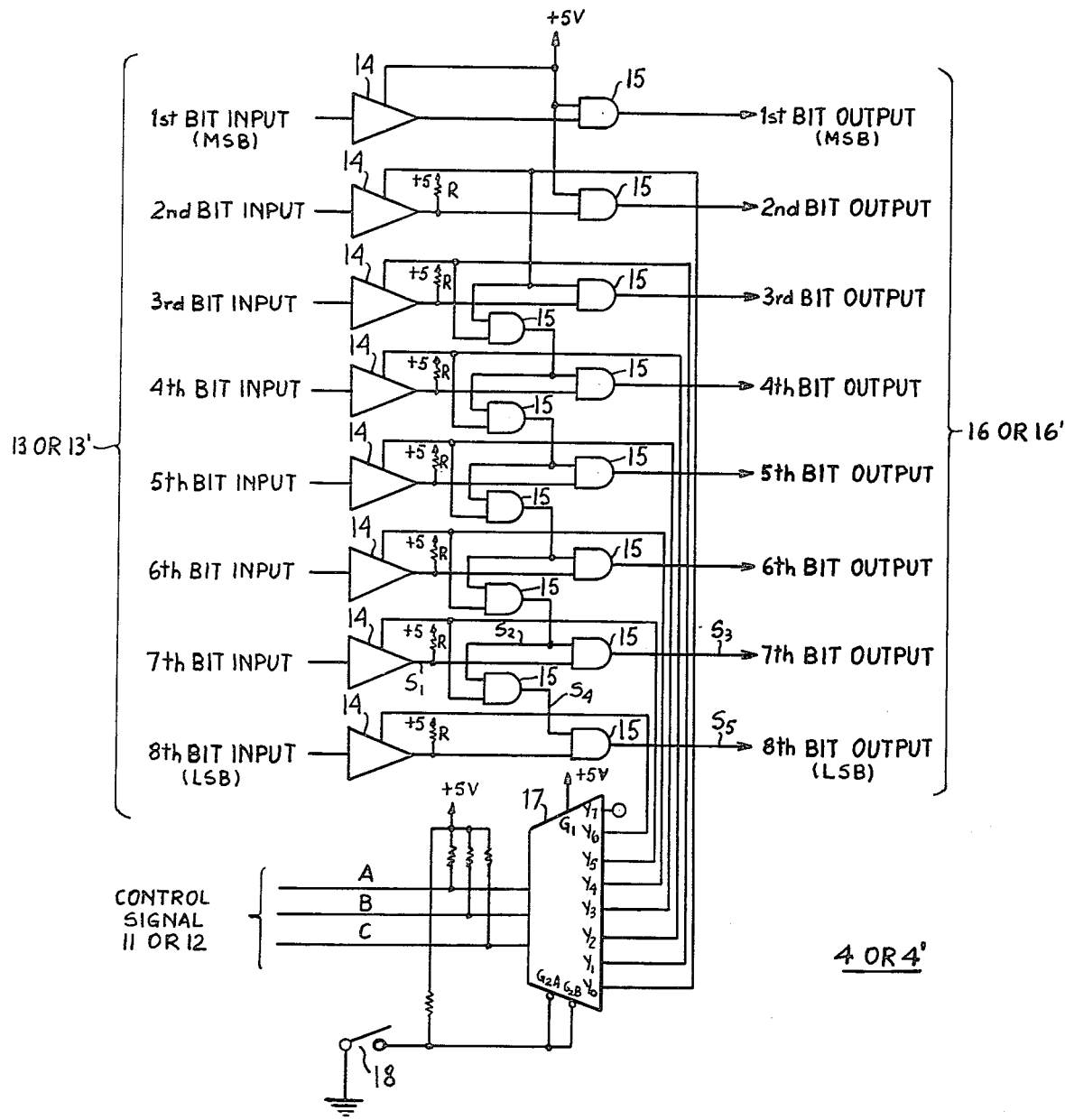
FIG. 5 shows a circuit diagram of the gradation modification circuit used in the embodiment shown in FIG. 4.

As previously stated, the gradation circuits 4 and 4' are controlled in accordance with the compensation methods shown in FIGS. 1 to 3. An example of the gradation modifying circuit will be described with reference to FIG. 5. In the illustrated circuit, the 8-bit parallel video codeword 13 (13') for each sample, i.e., the first bit (MSB) to the 8th bit (LSB), is applied to associated tristate buffers 14, respectively. The output of the tristate buffers 14 are supplied to a group of AND gates 15, the outputs of which are provided as the output 16 (16') of the gradation modification circuit.

The external control signals are supplied to a decoder 17, whose output signals are applied to the corresponding tri-state buffers 14. In this embodiment device, U.S. Ser. No. 74LS138N, manufactured by Texas Instrument Co., Ltd., may be used for decoder 17.

In operation, when the bit B of the control signal is at a low level ("0") with the remaining signals A and C remaining at a high level ("1"), i.e., when the control signal in FIG. 1 is (1, 0, 1), the output Y5 of decoder 17 is low while the remaining outputs Y0 to Y4, and Y6 and Y7 are high. At this time, the output $S_1$ of the tri-state buffer on the data line of the 7th bit is floating. However, the Si output is raised to a higher voltage (+5V volts), by a bias through resistor R connected to the output side of the buffer 14. The output $S_2$ of AND gate 15 is also high so that AND gate output $S_3$ (the 7th bit output) becomes high. The AND gate output $S_4$ is low and therefore the AND gate output $S_5$ is low. Switch 18 controls the modification operation. Utilizing the above operation, the gradation modification shown in FIG. 1 is carried out. The gradation modification shown in FIG. 2 may also be readily realized with a logic circuit assembled in accordance with the correction method shown in FIG. 2.

Figure 6:
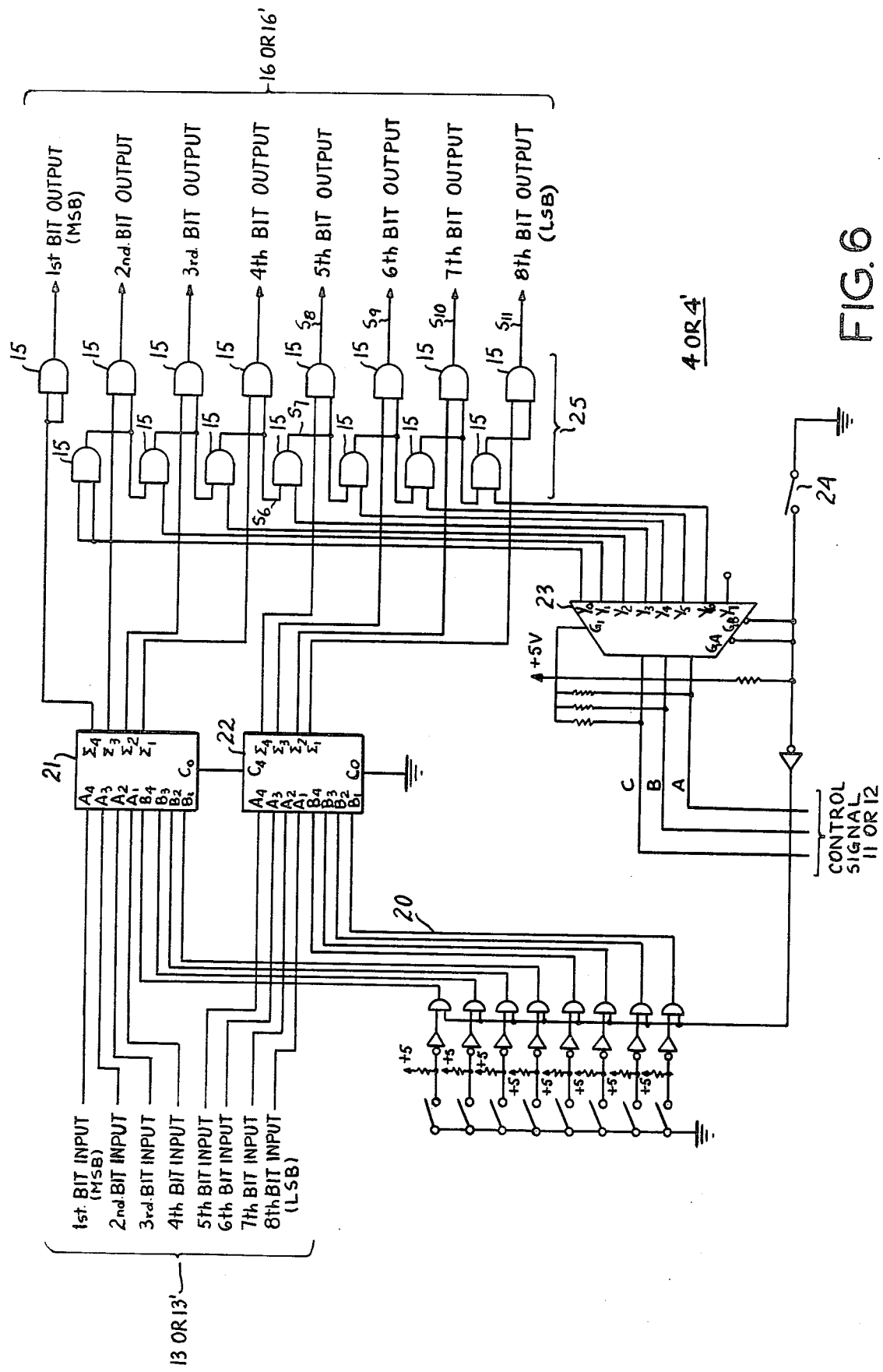
FIG. 6 shows another circuit diagram of gradation modification circuit which may be used in the embodiment of FIG. 4.

Referring to FIG. 6, there is shown another example of the gradation modification for the technique illustrated in FIG. 3. In this circuit, the variable codewords externally supplied have been added in advance to the video signal codeword in anticipation of DC level compensation. In response to the exterior control signals, the number of bits of the video codeword, to be outputed as video signal data are limited. Also, not only the DC correction level, but also the Y or C components are made variable by the group of switches 26.

Input video codeword 13 (13') and DC compensation data 20 are added at adders 21 and 22. The outputs of adders 21 and 22 are then applied to a gate circuit 25 comprising of a plurality of AND gates 15. The exterior control signals are applied to decoder 23 and only when control switch 24 is turned on does decoder 23 operate to control the gate circuit 25. For example, when the control signal shown in FIG. 3 is (0, 1, 1,) only the output Y3 of decoder 23 is low in level while the remaining outputs Y0 to Y2, and Y4 to Y7 are high. The output $S_6$ from the AND gate 15 is high and the outputs $S_7$ and $S_8$ are low. Accordingly, the 5th and less significant bits, i.e., outputs $S_9$, $S_{10}$ and $S_{11}$, are all low. At this time, only the first bit (MSB) to the fourth bit are effective to realize the gradation modification with the DC level compensation.

Although a specific embodiment of this invention has been shown and described, it will be understood that various modifications may be made without departing from the spirit of this invention.

What is claimed is:

1. Digital video effects apparatus for providing special video effects by controlling the number of quantization levels for each sample of an incoming television video signal, the apparatus comprising: means for converting said incoming television video signal into a digital video signal with each video sample represented by a predetermined number of binary bits; a gradation modifying circuit for decreasing the gradation represented by said digitized video signal; and means for converting the output of said gradation modifying circuit into an analog signal to reproduce said television video signal with said special effects, said gradation modifying circuits further including means for changing the (N+1)th bit, counted from the MSB of said digital video signal, to a logical "1" level and the (N+2)th bit and all less significant bits to a logical "0" level.

2. Digital video effects apparatus for providing special video effects by controlling the number of quantization levels for each sample of an incoming television video signal, the apparatus comprising: means for converting said incoming television video signal into a digital video signal with each video sample represented by a predetermined number of binary bits; a gradation modifying circuit for decreasing the gradation represented by said digitized video signal; and means for converting the output of said gradation modifying circuit into an analog signal to reproduce said television video signal with said special effects, said gradation modifying circuit further including means for changing the (N+1)th bit, counted from the MSB of said digital video signal, to a logical "0" level and the (N+2)th bit and all less significant bits to a logical "1" level.

3. Apparatus for providing digital video effects, comprising,
an A/D converter for converting a television video signal into a digital video signal, said digital video signal having a luminance component and a chrominance component and each component having a predetermined digital gradation,
means for separating said luminance component from said chrominance component,
means for modifying the gradation of each of said components, means for adding said modified gradation luminance component to said modified gradation chrominance component, and a D/A converter for converting said added chrominance components into an analog video signal, said digital video signal being comprised of a predetermined number of binary bits, said modifying means including means for changing the (N+1)th bit, counted from the MSB of said digital video signal, to a logical "1" level and the (N+2)th bit and all less significant bits to a logical "0" level.

4. Apparatus for providing digital video effects, comprising, an A/D converter for converting a television video signal into a digital video signal, said digital video signal having a luminance component and a chrominance component and each component having a predetermined digital gradation, means for separating said luminance component from said chrominance component, means for modifying the gradation of each of said components, means for adding said modified gradation luminance component to said modified gradation chrominance component, and a D/A converter for converting said added chrominance components into an analog video signal, said modifying means further including means for changing the (N+1)th bit, counted from the MSB of said digital video signal, to a logical "0" level and the (N+2)th bit and all less significant bits to a logical "1" level.

* * * * *